June 18, 1968     J. M. RAMARADHYA     3,388,967

PHOSPHORIC ACID PURIFICATION

Filed Oct. 29, 1964     4 Sheets-Sheet 1

Inventor
Jakkanahally M. Ramaradhya
By Stevens Davis Miller & Mosher
Attorneys

June 18, 1968  J. M. RAMARADHYA  3,388,967
PHOSPHORIC ACID PURIFICATION

Filed Oct. 29, 1964  4 Sheets-Sheet 4

EXTRACTION (STAGE TWO)

Inventor
Jakkanahally M. Ramaradhya
By Stevens, Davis, Miller & Mosher
Attorneys

United States Patent Office 3,388,967
Patented June 18, 1968

3,388,967
PHOSPHORIC ACID PURIFICATION
Jakkanahally Malliaradhya Ramaradhya, Trail, British Columbia, Canada, assignor to Cominco Ltd.-Cominco Ltee., a corporation of Canada
Filed Oct. 29, 1964, Ser. No. 407,496
Claims priority, application Canada, July 20, 1964, 907,586
9 Claims. (Cl. 23—165)

ABSTRACT OF THE DISCLOSURE

Impure aqueous phosphoric acid made by the "wet process" is purified by extraction with a solvent selected from propyl acetates, butyl acetates, amyl acetates and mixtures thereof. The extract is treated with water to recover purified phosphoric acid. Optionally, the extraction can be preceded by a defluorination step and can be carried out as a multistage countercurrent extraction process.

---

This invention relates to the purification of phosphoric acid.

Commercially available phosphoric acid may be made by the "furnace" or "thermal reduction," process which is a relatively expensive process for the manufacture of a relatively pure product, or by the "wet process" which produces a cheaper, relatively impure product. Such product is purified according to the present invention.

One "wet process" involves reacting phosphate rock with sulphuric acid to produce phosphoric acid and gypsum. The gypsum is discarded and the phosphoric acid may be used as such for the production of various ammonium phosphate fertilizers. The phosphoric acid produced in the aforementioned procedure contains about 32% $P_2O_5$ (44% $H_3PO_4$) but also appreciable amounts of impurities. For solid fertilizer production the acid is evaporated to about 36% $P_2O_5$ and is then reacted with ammonia to produce an ammonium phosphate slurry which is treated to form a dry, granular product. For liquid fertilizer, the acid is evaporated to about 50% $P_2O_5$ (69% $H_3PO_4$). Since phosphoric acid is sold commercially in this form, the dark green acid so formed will be known herein as "sales acid."

While the impure "sales acid" may be used as liquid fertilizer it must be purified to meet specifications for use in the production of chemicals and stock feed. Many procedures have been used in the past for such purifications in which the impure aqueous phosphoric acid (sales acid) is brought into contact with an organic solvent immiscible with water. In such procedures the acid is extracted by the solvent and is subsequently recovered from the solvent by a separate step in which the solution is agitated with water and the acid is thus transferred from the solvent to the water.

One old contemplated procedure involved the use, as a solvent, of a mixture of a water immiscible monohydroxylalcohol having not more than eight carbon atoms in the chain carrying the hydroxyl group and an aliphatic ester, preferably an ester of an alcohol also having not more than eight carbon atoms in the chain carrying the hydroxyl group. Another old contemplated procedure involved the use, as a solvent, of a water miscible organic solvent having a boiling point lower than water, e.g., ketones, alcohols, ethers and esters, preferably acetone. Another contemplated procedure involved the use, as a solvent, of a water-insoluble phosphate ester. A modification of the latter procedure involved the use of a water-immiscible trialkylphosphate.

It has now been found that such impure aqueous phosphoric acid may be purified using an acetate selected from the group consisting of propyl acetates, butyl acetates and amyl acetates and mixtures of acetates containing at least one said acetate.

By one aspect of the present invention there is provided a process for the purification of phosphoric acid which comprises contacting an impure aqueous phosphoric acid with a water immiscible solvent selected from the group consisting of propyl acetates, butyl acetates, amyl acetates and mixtures thereof.

By another aspect of the present invention, there is provided a process for the purification of phosphoric acid which comprises contacting an impure aqueous phosphoric acid with a water immiscible solvent selected from the group consisting of propyl acetates, butyl acetates, amyl acetates and mixtures thereof; recovering an extract and washing said extract with water, whereby a purified aqueous phosphoric acid is obtained.

By yet another aspect of this invention, there is provided a multistage countercurrent process for the purification of phosphoric acid which comprises contacting a water immiscible solvent selected from the group consisting of propylacetates, butyl acetates, amyl acetates and mixtures thereof, with a raffinate from a previous extraction stage, said raffinate being obtained by contacting an impure aqueous phosphoric acid with said solvent; recovering an extract; and washing said extract with water, whereby a purified aqueous phosphoric acid is obtained.

By still another aspect of this invention, there is provided a multistage countercurrent process for the purification of phosphoric acid which comprises defluorinating an impure aqueous phosphoric acid; passing said acid to a first extraction stage where it is contacted countercurrently with a second extract containing a water immiscible solvent selected from the group consisting of propyl acetates, butyl acetates, amyl acetates and mixtures thereof, thereby producting a third extract and a first raffinate; contacting said first raffinate countercurrently with a first extract containing a water immiscible solvent selected from the group consisting of propyl acetates, butyl acetates, amyl acetates and mixtures thereof and producing said second extract and a second raffinate; contacting said second raffinate countercurrently with a water immiscible solvent selected from the group consisting of propyl acetates, butyl acetates, amyl acetates, and mixtures thereof, thereby producing said first extract and a final raffinate; contacting said third extract with water; and recovering a purified aqueous phosphoric acid. Preferably, this aspect includes, as a final step, recycling said water immiscible solvent to said third extraction stage. The final raffinate contains impurities and phosphoric acid. This raffinate is removed from the process and can be treated as desired, for example, by passing it to a fertilizer plant for recovery of $P_2O_5$ in the form of phosphatic fertilizer.

It has been found that best results are obtained with water immiscible solvents that include preponderant quantities of either propyl acetate, butyl acetate or amyl acetate or mixtures containing two or more of these acetates. A suitable solvent is that known in the trade as "234 acetate," obtained from Canadian Chemical Company, Edmonton, Canada. This solvent consists of a mixture of 10% ethyl acetate, 10% propyl acetate and 80% butyl acetate, and includes both normal and isoacetates.

It has been found that the efficiency of extraction of $P_2O_5$ decreases with increase in the hydrocarbon chain length. Thus, the efficiency of hexyl acetate is believed to be too low for practical purposes. On the other hand, the degree of extraction of impurities decreases with increase in hydrocarbon chain length. Thus, ethyl acetate extracts excessive amounts of impurities. Methyl acetate is also unsuitable: it foams excessively and furthermore, its solubility in water is too high for easy separation of organic and aqueous phases. Furthermore, the alcohols corresponding to the aforesaid esters are miscible with water, and hence are unsuitable for the present invention. The following table illustrates some comparative tests:

IMPURITIES EXTRACTED FROM SALES ACID, mg./l.

|  | Fe | Al | Cr | V | Zn |
|---|---|---|---|---|---|
| Ethyl acetate | 1,000 | 500 | 100 | 200 | 300 |
| 1,000 acetate [1] | 1,000 | 500 | 100 | 200 | 200 |
| Acetate mixture [2] | 1,000 | 500 | 100 | 100 | 100 |
| 234 acetate | 500 | 300 | 30 | 50 | 50 |
| Isoamyl acetate | 200 | 100 | 20 | 20 | <100 |
| Methylamyl acetate | 50 | 50 | 10 | <50 | <50 |

[1] A commercially available mixture of 65% ethyl acetate, remainder isopropyl acetate.
[2] A mixture of 50% ethyl acetate and 50% isoamyl acetate.

The solubility of the acetate decreases with increase in hydrocarbon chain length. The solubilities of the normal esters in 100 gm. of water at 20° C. are:

|  | Gm. |
|---|---|
| Ethyl acetate | 8.6 |
| Propyl acetate | 1.9 |
| Butyl acetate | 0.5 |
| Amyl acetate | 0.18 |

The relatively high solubility of ethyl acetate is another disadvantage which makes it unsuitable for use in the process of the present invention.

It has been found that extraction efficiency decreases with decreasing concentrations of $P_2O_5$ in the impure aqueous phosphoric acid. Useful results are achieved in the practice of the present invention with concentrations as low as 32% $P_2O_5$. Preferred concentrations are 46–52% $P_2O_5$ with 50% $P_2O_5$, "sales acid," being especially preferred.

It has been found that higher product acid concentrations may be obtained by increasing the feed acid concentrations, or by using more extraction stages or more recovery stages, or by evaporation. The usual concentration from three extraction stage is from about 18% to about 33% $P_2O_5$ with one recovery stage; concentrations as high as about 42% $P_2O_5$ may be obtained, particularly with two or more recovery stages. By evaporation of the 30% $P_2O_5$ product, a product having a concentration of 77% $P_2O_5$ may be obtained. This high concentration is attributable to conversion of some acid from the ortho- to the pyro- or other poly-acid form.

It was observed that changes in the solvent to feed ratio have very little effect on the efficiency of the process of this invention. However, ratios of solvent/feed of from about 1.5:1 to about 2.5:1 are desirable.

Decreasing the water/feed ratio in the recovery stage has been found to increase the product concentration calculated as $P_2O_5$. Thus, it has been found that decreasing the water/feed ratio from 0.7 down to 0.3 by weight, increased the product concentration from 19.6% $P_2O_5$ to 33.1% $P_2O_5$ (by weight). Ratios of 0.3–1.0 by weight have been found to be satisfactory.

It has been found that the solvent should contact the impure acid for at least 0.5 minute. Contact times as long as one hour are, of course, satisfactory, but times of the order of fifteen minutes are ample. Acid feed rates may be varied considerably.

It is desirable to operate the countercurrent extraction at above room temperature. Extraction efficiency in the extraction stages is lowered very slightly as temperature is increased, but on the other hand, extraction efficiency in the recovery step is increased considerably at higher temperatures. The process can be operated at 10–40° C., but preferably the operating temperature is in the range 30–40° C. The temperature range may be maintained simply by the heat of reaction of the countercurrent extraction.

In the accompanying drawings.

Figure 1:
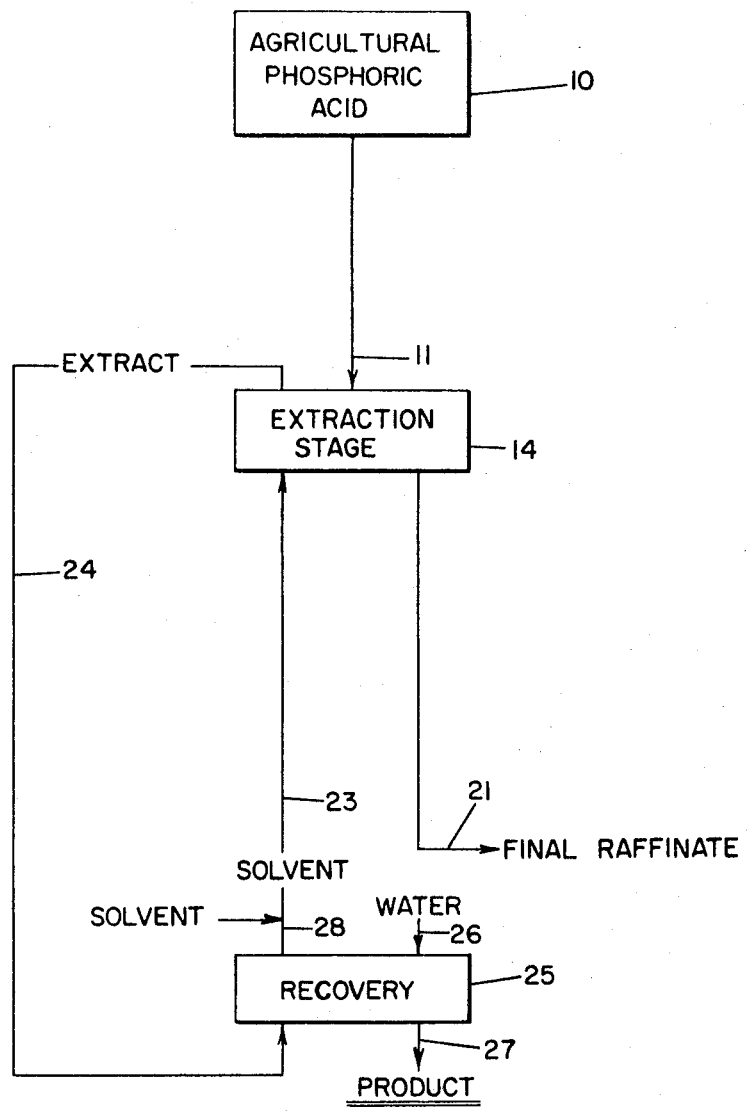
FIGURE 1 is a schematic flow diagram of a broad aspect of the present invention.

In the process as illustrated in FIGURE 1, the impure aqueous phosphoric acid (agricultural or sales phosphoric acid) from storage 10 is led via line 11 to an extraction stage 14. Here it is caused to mix with solvent flowing in via line 23. Extract flows via line 24 to a recovery stage 25, while raffinate is discarded via line 21. In the acid recovery stage, water is led in via line 26 to be intimately mixed with the extract. Pure acid product leaves via line 27 while recovered solvent is led to line 23 via outlet line 28.

Figure 2:
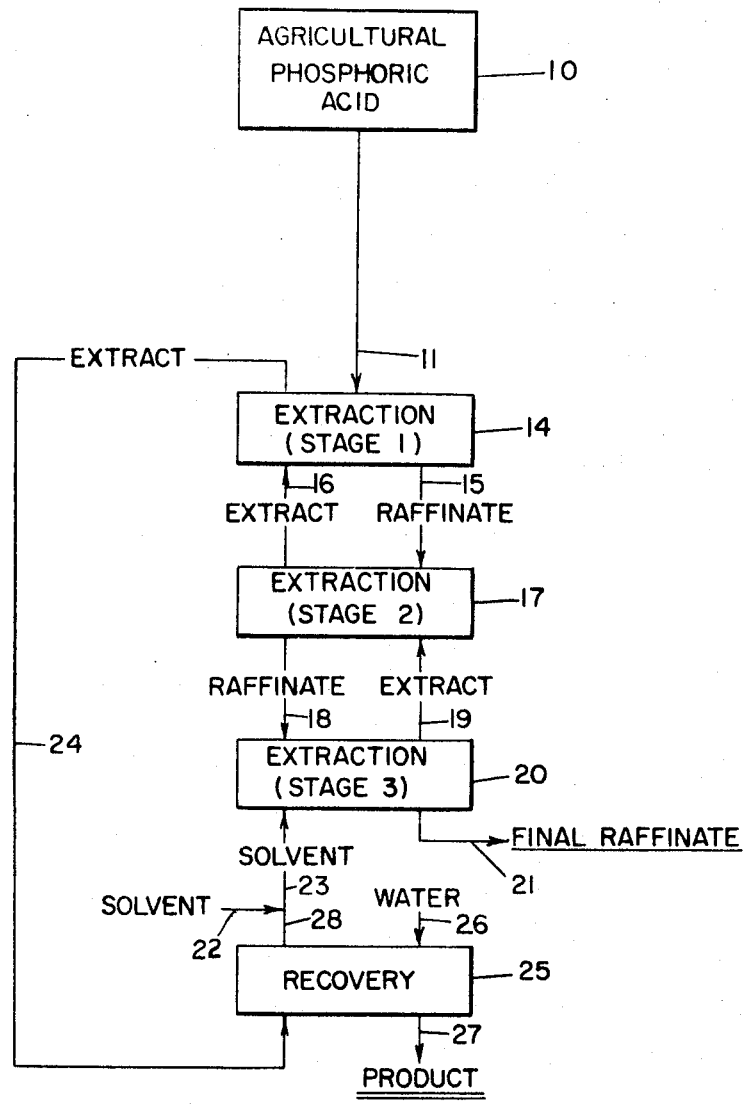
FIGURE 2 is a schematic flow diagram of a modified aspect of the present invention.

FIGURE 2 shows a modified form of the process. It provides three, rather than one, extraction stages. In the first extraction stage 14, the impure acid is contacted with extract from the second extraction stage 17 which enters the first extraction stage 14 via line 16. The raffinate from the first extraction stage 14 enters the second extraction stage 17 via line 15 and is contacted with extract from the third extraction stage 20 which enters the second extraction stage 17 via line 19. The raffinate from the second extraction stage 17 is then led via line 18 to the third extraction stage 20. Raffinate in the third extraction stage 20 is contacted with solvent entering via line 22 and solvent line 23. Final raffinate leaves the third extraction stage via line 21.

Figure 3:
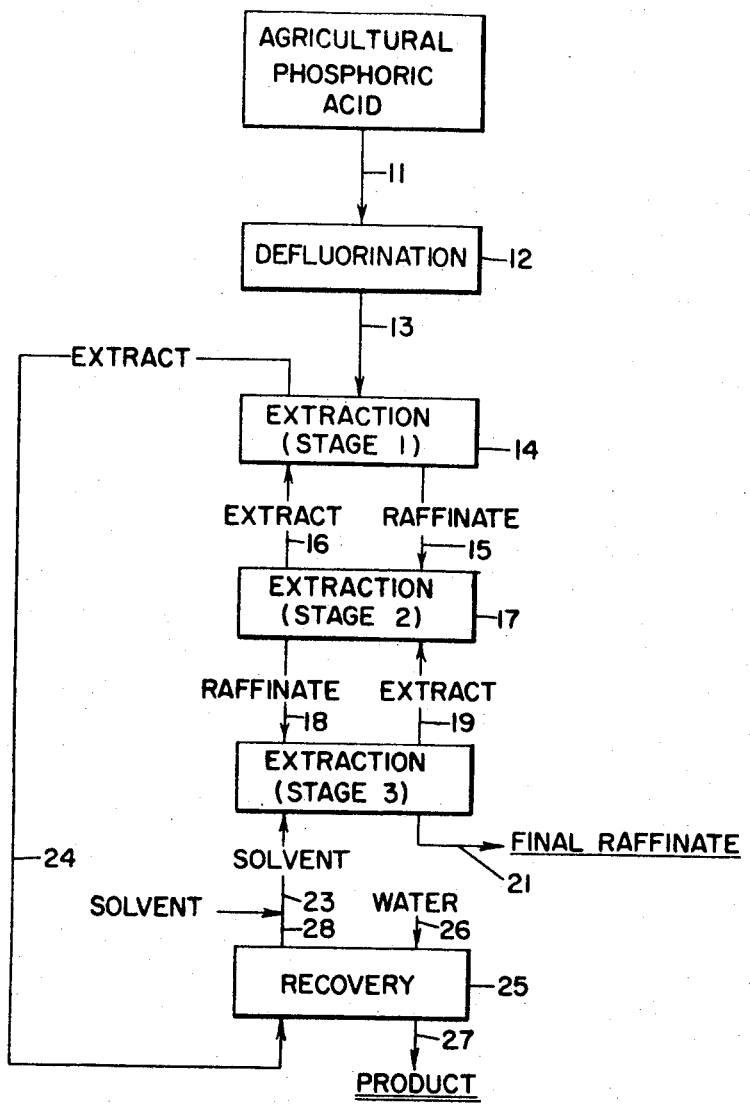
FIGURE 3 is a schematic flow diagram of a preferred aspect of the present invention.

The preferred aspect of the invention is shown in FIGURE 3. Here it is seen that an additional defluorination stage 12 is included, wherein fluorine-containing impure aqueous phosphoric acid enters via line 11 and defluorinated acid leaves via line 13 to the first extraction stage 14. Defluorination is carried out because transfer of metallic impurities from "sales acid" to the organic solvent can be reduced by removing fluoride ions from the acid prior to the extraction step. The defluorination of the feed acid can be effected by any known means, e.g., by addition to the acid of sodium carbonate and silicic acid in order to precipitate sodium fluosilicate.

Thus, the procedure outlined above involves a process wherein the phosphoric acid is transferred from impure aqueous solution to the solvent. The extract, that is, the solvent plus the phosphoric acid, after passing through the extraction stages countercurrent to the flow of acid, is passed to the single recovery stage where the water removes phosphoric acid from the organic solvent and the resultant aqueous solution is separated as product, or for further treatment if required. The organic solvent is recycled. While the recovery step has been shown to include only a single stage, it may also include two or more stages.

A countercurrent multistage recovery step is preferred when a multistage extraction operation is used. For example, in a two-stage recovery step used with a three-stage extraction operation, water is mixed with solvent containing some phosphoric acid in the first recovery stage. Phosphoric acid is transferred to the water from the solvent, and the depleted solvent is passed to the third extraction stage of the process. The resultant aqueous phosphoric acid from the first recovery stage is passed to the second recovery stage where it is mixed with extract from the first extraction stage. The extract, a mixture of solvent and phosphoric acid, gives up most of its phosphoric acid to the aqueous phase in the second recovery stage, and the resulting mixture of solvent with a minor amount of phosphoric acid is passed to the first recovery stage.

The aqueous solution produced on mixing in the second recovery stage the aqueous phosphoric acid from the first recovery stage with the extract from the first extraction stage constitutes the product of the process, purified aqueous phosphoric acid.

Any organic solvent removed from the process in the final raffinate and in the product can be recovered, for example, by steam distillation, and returned to the process.

Figure 4:
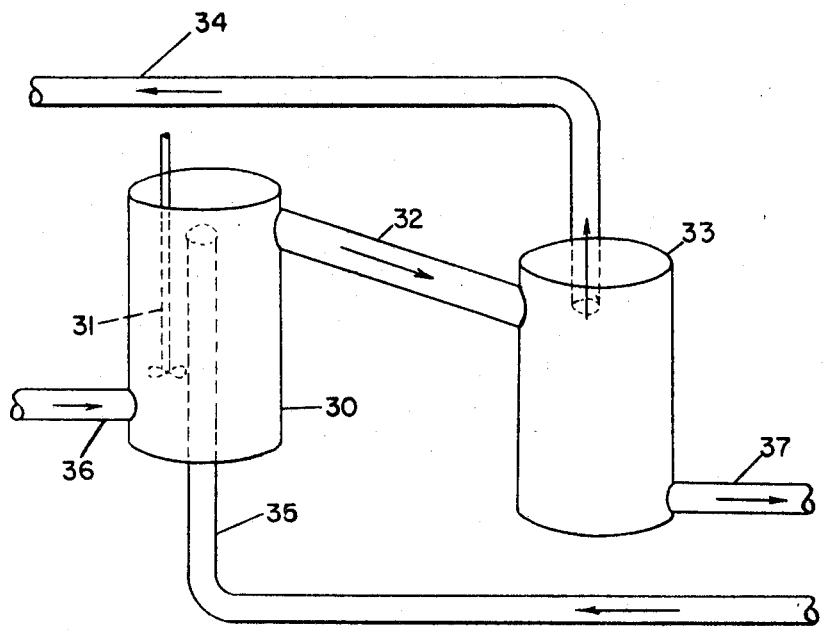
FIGURE 4 is an isometric view of a typical mixer-settler extraction or recovery stage.

FIGURE 4 illustrates a typical mixer-settler extraction or recovery stage. The stage consists of a mixer 30, including an agitator 31, connected to a settler 33 via line 32. Raffinate from a previous stage enters mixer 30 via line 35, while extract from a subsequent stage enters mixer 30 via line 36. The agitator 31 ensures rapid and thorough mixing in the mixer 30. The settler 33 allows separation of the mixture into two liquid phases: extract (organic phase) and raffinate (aqueous residue). Extract from settler 33 is led to a previous stage via line 34, while raffinate is removed to a subsequent stage via outlet line 37.

In a pilot plant, mixers and settlers were made of lead; storage tanks were made of stainless steel or polyethylene, while the connecting lines were made of polyethylene. Impure aqueous phosphoric acid used as feed contained 50% $P_2O_5$. The water/feed ratio was about 0.4 while the contact time was 15 minutes. Acid feed rates of 150–300 grams per minute were used to give a retention time of 15 minutes per stage at a production rate of 45 gallons of purified acid per day. The temperature was maintained at 30 to 40° C. by the heat of reaction. Under steady conditions, the specific gravity of the solvent increased from about 0.88 to about 1.02 in passing from the inlet to the third extraction stage to the outlet from the first extraction stage. The specific gravity of the fed acid entering the first stage was about 1.65 and that of the raffinate from the third stage was about 1.56.

Generally the process will produce a purified acid of 30% $P_2O_5$ concentration with an impure feed acid of 50% $P_2O_5$ concentration, with recovery of 70% of the $P_2O_5$ in the impure acid.

With respect to the defluorination, a test was carried out as follows:

One kilogram of sales acid was heated to 125° C. with 10 gm. silicic acid and 35 gm. sodium carbonate and filtered. The filtrate (47.0% $P_2O_5$) was treated by 234 acetate extraction followed by a recovery step, resulting in a colourless product acid with the following typical assay:

| | | |
|---|---|---|
| $P_2O_5$ | percent | 25 |
| F | do | 0.003 |
| Na | do | 0.018 |
| K | do | 0.002 |
| Fe | mg./l. | 300 |
| Al | mg./l. | 200 |
| Cr | mg./l. | 20 |
| V | mg./l. | 10 |
| Zn | mg./l. | 50 |

The following is a typical example of pilot plant data during operation of the process of the present invention:

| | |
|---|---|
| $P_2O_5$ in feed acid _____percent__ | 51.3 |
| Feed rate _____grams/min__ | 200 |
| Solvent feed ratio, by wt. _____ | 2.25 |
| Water feed ratio, by wt. _____ | 0.4 |
| Temp., ° C. _____ | 35 |
| Operating time _____hours__ | 96 |
| $P_2O_5$ in product _____percent__ | 33 |

TYPICAL ANALYSES

| | $P_2O_5$, percent | F, percent | Na, percent | K, percent |
|---|---|---|---|---|
| Feed | 51.3 | 1.2 | 0.047 | 0.015 |
| Product | 33 | 0.01 | 0.004 | 0.004 |
| Double Extraction Product [1] | 30 | <0.01 | | |

| | Fe | Al | Cr | V | Zn |
|---|---|---|---|---|---|
| Feed (g./l.) | 15 | 18 | 0.7 | 0.75 | 0.55 |
| Product (mg./l.) | 1,100 | 840 | 40 | 60 | 45 |
| Double Extraction Product (mg./l.) [1] | 120 | 50 | <10 | <10 | 0.1 |

[1] The pilot plant product was evaporated to a concentration of 45.7% $P_2O_5$ and treated a second time to make the double extraction product.

I claim:

1. A process for the purification of impure aqueous phosphoric acid which is obtained by the digestion of phosphate rock with sulfuric acid and subsequent removal of solid impurities by filtration which process comprises contacting said impure aqueous phosphoric acid with a solvent selected from the group consisting of propyl acetates, butyl acetates, amyl acetates and mixtures thereof.

2. A process for the purification of impure aqueous phosphoric acid which is obtained by the digestion of phosphate rock with sulfuric acid and subsequent removal of solid impurities by filtration which process comprises contacting said impure aqueous phosphoric acid with a solvent selected from the group consisting of propyl acetates, butyl acetates, amyl acetates and mixtures thereof; recovering an extract and washing said extract with water, whereby a purified aqueous phosphoric acid is obtained.

3. A multistage countercurrent process for the purification of an impure aqueous phosphoric acid which is obtained by the digestion of phosphate rock with sulfuric acid and subsequent removal of solid impurities by filtration which process comprises: contacting a solvent solution containing a solvent selected from the group consisting of propyl acetates, butyl acetates, amyl acetates and mixtures thereof, with a raffinate from a previous extraction stage, said raffinate being obtained by contacting said impure aqueous phosphoric acid with said solvent; subsequently recovering an extract comprising said solvent and phosphoric acid, and washing said extract with water, to obtain a purified aqueous phosphoric acid.

4. A process as claimed in claim 3, in which the rates of feed of said solvent and said impure aqueous phosphoric acid to said process are in the ratio of between 1.5:1 and 2.5:1, the concentration of $P_2O_5$ in said impure aqueous phosphoric acid is at least 32% and the total contact time of said solvent with said phosphoric acid in all of said extraction stages is between 0.5 minute and 1 hour.

5. A multistage countercurrent process for the purification of an impure aqueous phosphoric acid which is obtained by the digestion of phosphate rock with sulfuric acid and subsequent removal of solid impurities by filtration which process comprises: defluorinating an impure aqueous phosphoric acid; passing said acid to a first extraction stage where it is contacted countercurrently with a second extract containing a solvent selected from the group consisting of propyl acetates, butyl acetates, amyl acetates and mixtures thereof, thereby producing a third extract and a first raffinate; contacting said first raffinate countercurrently with a first extract containing a solvent selected from the group consisting of propyl acetates, butyl acetates, amyl acetates and mixtures thereof, and producing said second extract and a second raffinate; contacting said second raffinate countercurrently with a solvent selected from the group consisting of propyl acetates, butyl acetates, amyl acetates and mixtures thereof, thereby producing said first extract and a final raffinate; contacting said third extract with water; and recovering a purified aqueous phosphoric acid.

6. A multistage countercurrent process for the purification of an impure aqueous phosphoric acid which is obtained by the digestion of phosphate rock with sulfuric acid and subsequent removal of solid impurities by filtration which process comprises: passing said acid to a first extraction stage where it is contacted countercurrently with a second extract containing a solvent selected from the group consisting of propyl acetates, butyl acetates, amyl acetates, and mixtures thereof, thereby producing a third extract and a first raffinate; contacting said first raffinate countercurrently with a first extract containing a solvent selected from the group consisting of propyl acetates, butyl acetates, amyl acetates and mixtures thereof, and producing said second extract and a second raffinate; contacting said second raffinate countercurrently with a solvent selected from the group consisting of propyl acetates, butyl acetates, amyl acetates and mixtures thereof, thereby producing said first extract and a final raffinate; contacting said third extract with water in at least one recovery stage; separately recovering purified aqueous phosphoric acid and solvent from said recovery stage; and recycling said solvent to said third extraction stage.

7. A multistage countercurrent process for the purification of an impure aqueous phosphoric acid which is obtained by the digestion of phosphate rock with sulfuric acid and subsequent removal of solid impurities by filtration which process comprises: defluorinating an impure aqueous phosphoric acid; passing said acid to a first extraction stage where it is contacted countercurrently with a second extract containing a solvent selected from the group consisting of propyl acetates, butyl acetates, amyl acetates and mixtures thereof, thereby producing a third extract and a first raffinate; contacting said first raffinate countercurrently with a first extract containing a solvent selected from the group consisting of propyl acetates, butyl acetates, amyl acetates and mixtures thereof, and producing said second extract and a second raffinate; contacting said second raffinate countercurrently with a solvent selected from the group consisting of propyl acetates, butyl acetates, amyl acetates and mixtures thereof, thereby producing said first extract and a final raffinate; contacting said third extract with water in at least one recovery stage; separately recovering purified aqueous phosphoric acid and solvent from said recovery stage; and recycling said solvent to said third extraction stage.

8. The process of a multistage countercurrent process for the purification of impure aqueous phosphoric acid which is obtained by the digestion of phosphate rock with sulfuric acid and subsequent removal of solid impurities by filtration which process comprises passing said acid to a first extraction stage where it is contacted countercurrently with a second extract containing a solvent selected from the group consisting of propyl acetates, butyl acetates, and mixtures thereof, thereby producing a third extract and a first raffinate; contacting said first raffinate countercurrently with a first extract containing a solvent selected from the group consisting of propyl acetates, butyl acetates, amyl acetates and mixtures thereof, and producing said second extract and a second raffinate; contacting said second raffinate countercurrently with a solvent selected from the group consisting of propyl acetates, butyl acetates, amyl acetates and mixtures thereof, thereby producing said first extract and a final raffinate; contacting said third extract with water in a plurality of recovery stages; separately recovering purified aqueous phosphoric acid and solvent from said recovery stages; and recycling said solvent recovered from said recovery stages to said third extraction stage.

9. The process of a multistage countercurrent process for the purification of impure aqueous phosphoric acid which is obtained by the digestion of phosphate rock with sulfuric acid and subsequent removal of solid impurities by filtration which process comprises: defluorinating an impure aqueous phosphoric acid; passing said acid to a first extraction stage where it is contacted countercurrently with a second extract containing a solvent selected from the group consisting of propyl acetates, butyl acetates, amyl acetates and mixtures thereof, thereby producing a third extract and a first raffinate; contacting said first raffinate countercurrently with a first extract containing a solvent selected from the group consisting of propyl acetates, butyl acetates, amyl acetates and mixtures thereof, and producing said second extract and a second raffinate; contacting said second raffinate countercurrently with a solvent selected from the group consisting of propyl acetates, butyl acetates, amyl acetates and mixtures thereof, thereby producing said first extract and a final raffinate; contacting said third extract with water in a plurality of recovery stages; separately recovery purified aqueous phosphoric acid and solvent from said recovery stages; and recycling said solvent recovered from said recovery stages to said third extraction stage.

References Cited
UNITED STATES PATENTS 2,880,063   3/1959   Baneil et al. _____ 23—165
3,304,157   2/1967   Baniel et al. _____ 23—165

OTHER REFERENCES

F. Zharovskii et al.: "Extraction of $HNO_3$, $H_2SO_4$ and $H_3PO_4$ With Oxygen Containing Solvents," Russian Journ. of Inorg. Chem., vol. 6, pp. 751–3 (1961).

F. G. Zharovskii and V. Melnik: "Chem. Abstracts," vol. 57, p. 1625f.

OSCAR R. VERTIZ, *Primary Examiner.*

MILTON WEISSMAN, *Examiner.*

A. GREIF, *Assistant Examiner.*